(12) United States Patent
Schaefer et al.

(10) Patent No.: US 7,533,132 B2
(45) Date of Patent: May 12, 2009

(54) PARALLEL REPLICATION MECHANISM FOR STATE INFORMATION PRODUCED BY SERIALIZED PROCESSING

(75) Inventors: Christian Schaefer, Leimen (DE); Lutz Schmidt, Nussloch (DE); Wolfgang Reichert, Holzgerlingen (DE)

(73) Assignee: SAP AG, Walldorf (DE)

( * ) Notice: Subject to any disclaimer, the term of this patent is extended or adjusted under 35 U.S.C. 154(b) by 1182 days.

(21) Appl. No.: 10/101,111

(22) Filed: Mar. 20, 2002

(65) Prior Publication Data

US 2002/0161789 A1 Oct. 31, 2002

(30) Foreign Application Priority Data

Mar. 21, 2001 (EP) .................................. 01107004

(51) Int. Cl.
G06F 12/00 (2006.01)
G06F 17/30 (2006.01)

(52) U.S. Cl. ........................ 707/203; 707/200; 707/204

(58) Field of Classification Search ......... 707/201–204; 711/117; 709/205, 220; 714/6, 9, 15
See application file for complete search history.

(56) References Cited

U.S. PATENT DOCUMENTS

| | | | |
|---|---|---|---|
| 5,787,247 A * | 7/1998 | Norin et al. ................. 709/220 |
| 5,937,414 A | 8/1999 | Souder et al. | |
| 6,023,772 A * | 2/2000 | Fleming ..................... 714/13 |
| 6,148,414 A * | 11/2000 | Brown et al. ................. 714/9 |
| 6,163,856 A * | 12/2000 | Dion et al. ................... 714/4 |
| 6,182,117 B1 * | 1/2001 | Christie et al. ............. 709/205 |
| 6,704,884 B1 * | 3/2004 | Shepherd et al. ............. 714/4 |

* cited by examiner

*Primary Examiner*—Don Wong
*Assistant Examiner*—Merilyn P Nguyen
(74) *Attorney, Agent, or Firm*—Finnegan, Henderson, Farabow, Garrett & Dunner, LLP (57) ABSTRACT

A method and system that replicates state information stored in a first data processing system to a second data processing system, whereby the state information is kept in a set of records. An incoming request message requesting a change of the state information is received and an indicator is assigned to the incoming request message representing the order in which the incoming request messages are processed. The sender of the incoming request message is sent a response message after confirmation that the at least one first storage subsystem received a modification record containing the indicator for the incoming request message and modification records of all predecessors of the incoming request message. The at least one first storage subsystem may send an acknowledge message to the first data processing unit confirming receipt of a modification record.

32 Claims, 2 Drawing Sheets

PARALLEL REPLICATION MECHANISM FOR STATE INFORMATION PRODUCED BY SERIALIZED PROCESSING

DESCRIPTION OF THE INVENTION

1. Field of the Invention

The present invention generally relates to creating and maintaining a duplicate copy of data which might be needed at a later point of time. More specifically, the present invention relates to a method and system for replicating state information stored in a first data processing system to a second data processing system, whereby the state information is kept in a set of records.

2. Background of the Invention

The expression "replication" basically refers to creating and maintaining a duplicate copy of a source data collection stored, e.g., in a database, a list, a table or in file system, on a destination data processing system. The term usually implies the way of how to copy the entire source data collection or parts of it which have changed since the last replication with the destination data processing system.

Different kinds of replication mechanisms are distinguished. Replication may be one-way or two-way. One-way replication refers to a scenario in which an object being subject to the replication process can only be modified in one place. A duplicate is mainly held as a read-only reference copy or as backup copy, i.e., a spare copy for use in the event of failure or loss of the original. In contrary, two-way replication means that the copy of the replicated object might also be modified and the changes have to be applied to the original one. Therefore, two-way replication is more complicated because of the possibility that a replicated object may have been updated differently in two locations in which case some method is needed to reconcile the different versions.

Furthermore, replication may be synchronous or asynchronous. In synchronous replication systems, no changes by a transaction is considered permanent until all changes made by the transaction are successfully applied at the source site and at all of the relevant destination sites. Asynchronous replication systems separate the task of making the changes at the source site from the task of making changes at the destination sites. Changes made by a transaction are made permanent at a source site without respect to whether the changes have been made permanent at any of the relevant destination sites.

From U.S. Pat. No. 5,937,414, a method is known for maintaining multiple copies of a body of data at multiple sites. According to the taught method, initially, a change to a first copy of the body of data at a first site is detected. Then, in response to detecting the change to the first copy, the following steps are performed. The change is asynchronously propagated to a second copy of the body of data at a second site and, finally, the changes are synchronously propagated to third copy of the body of data at a third site.

In case it has to be ensured that the replicated data can be used as a backup copy of the original data, only synchronous replication comes into question. Only this kind of replication compared to asynchronous replication guarantees that no changes applied to the original data get lost. In order to provide consistency in prior art replication systems, the changes applied to the original data are sequentially sent to the backup copy of the data on a backup system. Only at a point of time when a particular change has been successfully applied to the backup copy, the respective change to the original data is considered permanent. Hence, the time spread between a change request and an acknowledgment that the requested change has been applied includes the period of time for performing the change on the data, transmitting it to the backup system, waiting for the acknowledgment from the backup system and some additional computation time. Depending on the speed of the data connection to the backup system and its computation performance, the time spread needed for serving a change request might significantly increase.

SUMMARY OF THE INVENTION

The present invention provides methods and systems for replicating state information having an increased throughput, that is, the average number of requests that can be processed within a time interval. In accordance with one embodiment consistent with the present invention, methods and systems for parallel replication of state information of a first data processing unit in at least one second data processing unit, each of the at least one second data processing units having a replica of the state information of the first data processing unit, process an incoming request message for changing the state information in the first data processing unit and send a response message to a sender of the incoming request message after confirming a receipt of a modification record for the incoming request message and modification records of all predecessors of the incoming request message by each of the at least one first storage subsystems. The methods and systems also update state information in the replica of each of the at least one second data processing units based on the modification records, wherein an incoming request message contains an indicator and a modification record contains the indicator assigned to a corresponding incoming request message and all corresponding changes applied to a set of records used to represent the state information of the first data processing unit.

In accordance with another embodiment consistent with the present invention, methods and systems for replicating state information stored in a first data processing unit to a second data processing unit, whereby the state information are kept in a set of records, request a change of the state information. Methods and systems consistent with the present invention receive an incoming request message for changing the state information and assign an indicator to the incoming request message representing the order in which the incoming request messages are processed. The methods and systems additionally process the incoming request message and update the set of records in accordance with the result of the processing of the incoming request message and send a modification record to a first storage subsystem containing the indicator assigned to the incoming request message and all changes applied to the set of records performed during processing of the incoming request message. The methods and systems also check acknowledge messages which have been received from the second data processing unit indicating a receipt of the sent modification records and send a response message as a reaction to an incoming request message to the respective sender for such incoming request messages the modification record of which and the modification records of all its predecessors have been received by the first storage subsystem.

In accordance with still another embodiment consistent with the present invention, a system for replicating state information stored in a first data processing unit to a second data processing unit, whereby the state information are kept in a set of records, comprises an input port for receiving an incoming request message for changing the state information, an initializing unit for assigning an indicator to the incoming request message representing the order in which the incoming request messages will be processed, a first processing unit for processing the incoming request message and updating the set of records in accordance with the result of the processing of the incoming request message, a communication unit for sending a modification record to a first storage subsystem containing the indicator assigned to the incoming request message and all changes applied to the set of records performed during processing of the incoming request message, a control unit for checking acknowledge messages which have been received from the first storage subsystem indicating a receipt of the sent modification records, and a respond unit for sending a response message as a reaction to an incoming request message to the respective sender for such incoming request messages the modification record of which and the modification records of all its predecessors have been received by the second data processing unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate several embodiments of the invention and together with the description, server to explain the principles of the invention. In the figures.

DETAILED DESCRIPTION

The present invention is directed to replicating state information stored in a first data processing unit to a second data processing unit. State information generally describes how something is, e.g., its configuration, attributes, condition, locks or information content. Such information might relate to, e.g., a database, a process control system, system automation or monitoring. A state of such a system is usually temporary, i.e., it changes with time, and volatile, i.e., it will be lost or reset to some initial state if the system is switched off. In order to provide a copy of such state information as a backup a replication mechanism is used.

The replication takes place between at least two data processing units. The first one initiates the replication process and the second one keeps a backup copy of the original state information. Consistent with the present invention is an implementation of a one-way replication process. The data processing units might be formed by any machine or process that is able to manipulate data, preferably, they are formed by a computer system or an executing program running on a computer system.

The state information is kept in a set of records, whereby a record is an ordered set of fields, which might be stored in any kind of memory provided by the first data processing system. The records represent different entities with different values for the attributes represented by the fields. However, not all of the information to be stored needs to be written in a record. A record might rather keep a reference, such as a pointer, to a separate location at which additional information is stored.

The state information is created, modified or deleted as a result of the processing of an incoming request message or in general any data, requests, or events that trigger the processing. The processing in general may generate any data which are sent back as response to the sender of the request or which trigger an action as result of the incoming data. For each incoming request message received by the first data processing system, an indicator is assigned to the incoming request message representing the order or sequence in which the particular incoming request messages will be processed. The processing sequence might be governed by a priority assigned to the incoming request message or its content. Furthermore, the incoming request message is processed and the set of records is updated in accordance with the result of the processing of the incoming request message. Then a modification record is sent to a first storage subsystem preferably provided by the second data processing unit, whereby the modification record contains the indicator assigned to the incoming request message and all changes applied to the set of records performed during processing of the incoming request message. This enables the second data processing unit to redo all changes performed on the original state information using a copy of the state information kept in the second data processing unit.

In order to allow a short response time and parallelism between the reception of one particular incoming request message and sending a respective response message, according to the present invention, the actual replication process is split into a first phase and a second phase. Thus, there is no wait for the modification records to be completely processed by the second data processing system, i.e., all changes have been applied to the copy of the state information. Instead, in the first replication phase changes applied to the records are solely transmitted to the first storage subsystem, in the following, also referred to as "work area". The wait is only until the data has been stored successfully in the first storage subsystem. To provide a meaningful backup concept the first storage subsystem is preferably independent of the first data processing system ensuring that the data are safe and accessible by the second data processing system even if the first data processing system is broken. The first storage subsystem may reside on or should be part of the second data processing system.

The second data processing system is able to build an exact copy of the original state information. Thus, acknowledge messages are checked which have been received from the first storage subsystem indicating a receipt of the sent modification records and a response message as a reaction to an incoming request message is sent to the respective sender for such incoming request messages the modification record of which and the modification records of all its predecessors have been received by the first storage subsystem. Hence, although the changes to the state information are not immediately applied to the backup copy, a method and system consistent with the present invention nevertheless behaves like a synchronous replication system. Due to this two-phase concept it can be ensured that incomplete or inconsistent modification records are detected before changes are made to the backup copy. In other words, a replication mechanism consistent with the present invention ensures that a consistent copy of the state information can be produced. Later, in the second replication phase, independently from the data processing performed on the first data processing unit the notified changes are actually applied to the replica of the state information, as explained below in greater detail.

In order to further improve the overall performance and to utilize parallelism, consistent with an embodiment of the present invention, receiving an incoming request message, assigning an indicator, processing the incoming request message and sending a modification record are performed concurrently to checking acknowledge messages and sending a response message.

This concept allows the transmission of several changes applied to the original state information at the same time. The transmission bandwidth can be increased by providing more than one communication channel established between the first data processing unit and the first storage subsystem ("work area"). Consequently, the first storage subsystem is able to receive all modification records at the same time which are concurrently sent by the first data processing unit. This might be solved by splitting the first storage subsystem into several storage units each of which is connected to one communication channel reaching the second data processing unit. Due to this two-phase concept it is acceptable if modification records are transmitted out of sequence to the first storage subsystem.

After the modification records have safely been stored into the first storage subsystem, an acknowledge message is returned to the first data processing unit indicating a receipt of the particular modification record. Then, independently from the operation of the first data processing unit, the changes are applied to the copy of the state information by the second data processing system. The actual copy of the state information, however, is stored in a second storage subsystem provided in the second data processing unit. In order to allow an exact duplication of the original state information, each record stored in the second storage subsystem includes a field for storing the indicator representing the order in which the incoming request messages have been processed. The indicator has already been transmitted to the first storage subsystem as part of the modification record.

The operation of applying the changes stored in the modification records to the copy of the state information stored in the second storage subsystem could be done sequentially in the order in which the changes were originally requested. Preferably, consistent with one embodiment of the present invention, more than one change is applied to the copy of the state information at the same time. This increases the performance of the backup system. In order to facilitate that the recent changes to one and the same record of the state information are not wrongly overwritten by an older modification, applying changes includes storing the indicator assigned to the processed request message in the respective field of the changed records. In order to ensure that changes are correctly applied, the function of applying changes includes checking the stored indicator. Furthermore, only such modifications are applied which are more recent than the last change applied to a particular record.

The described method ensures that the whole system preserves the sequential order. Processing of an incoming request are kept pending, i.e. a response is not given until the following conditions are satisfied:
1. The modification record related to this request is successfully stored in the first storage subsystem and the respective acknowledgment has been received.
2. None of the preceding requests are in a pending state.

Condition 2 can be simplified by checking that the modification record of the last one before this request has been acknowledged. When this rule is applied recursively it covers the above condition.

On the second data processing unit similar checking is done. Before a modification record is considered to be applied to the backup copy the following conditions must be true:
1. The modification record is completely and correctly stored in the first storage subsystem.
2. None of the preceding modification records is missing or incomplete and therefore requires retransmission.

Condition 2 can be simplified here as well by checking that the modification record one before is completely and correctly stored.

By using the concepts of the present invention more than one replication copy of the state information may be created. In this case it is checked whether an acknowledge message from all sites providing a replica have been received indicating that a particular modification record has successfully been stored.

The present invention can be realized in hardware, software, or a combination of hardware and software. Any kind of computer system—or other apparatus adapted for carrying out the methods described herein—is suitable. For example, one combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein; and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Figure 1:
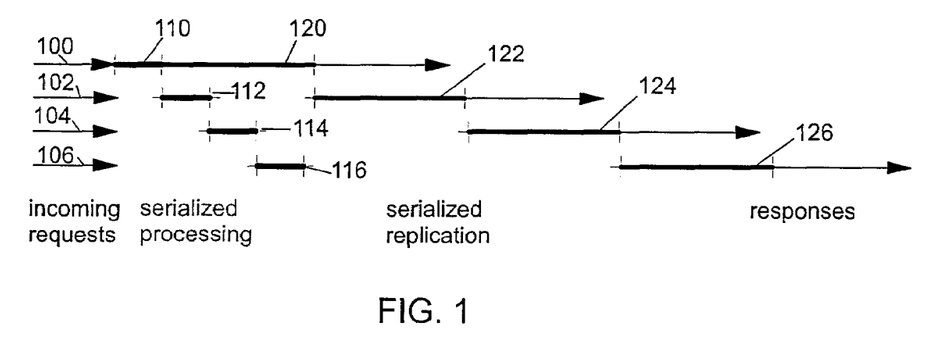
FIG. 1 shows a timing diagram of a known synchronous replication system.

FIG. 1 depicts a timing diagram of a known synchronous replication system. The lapse of time is illustrated as running from left to right. The graphical elements that are drawn in an imaginary line one upon the other represent operations taking place at the same instant of time. Thus, in the shown scenario a first incoming request 100, a second incoming request 102, a third incoming request 104 and a fourth incoming request 106 are arriving at an input port of a first data processing system (not shown) at the same simultaneously.

Only one incoming request can be served concurrently, since its processing might involve changes to stored state information and the write access to such information is limited to one process. Therefore, the incoming requests 100 to 106 are processed one after the other. Bar 110 illustrates the time gap that is needed to process the first incoming request 100. Bars 112,114 and 116 represent the lapse of time required to serve the second, third and fourth incoming request 102 to 106, respectively.

Directly after the processing of the first incoming request 100 is concluded the processing of the second incoming request 102 is commenced. Furthermore, a replication process is initiated, i.e., it is started to transmit the changes, which were applied to the original state information as a result of the first incoming request 100, to a second data processing unit. On the second data processing unit the transmitted changes will be applied to a copy of the original state information in the same way as it is performed in the first data processing unit. Hence, the order in which the changes get applied to the original state information they have to be applied to the duplicate. In order to provide the behavior of a synchronous replication system, a response message to the sender of the incoming request is only sent after the changes have successfully been transmitted to the second data processing unit, they have been applied to the replica and an acknowledge message has been received. The time gap for these actions is depicted as bar 120 which follows bar 110. At the rightmost end of bar 120 the moment in time is reached when the response message is sent to the sender of the first incoming request 100 indicating that the request has been served.

Only after the replication of the changes that have been applied to the state information as a result of the processing of the first incoming request is concluded, the changes initiated by the second incoming request 102 can be replicated as illustrated by bar 122. Correspondingly, the replication of changes because of the third and fourth incoming message 104 and 106 are done as indicated by the bars 124 and 126. Mostly because of data transmission over a network to the second data processing unit which might be comparably slower than processing of the data within the first data processing unit, the period of time needed to apply changes to the original state information is much shorter than the time spread needed for the replication as illustrated by the longer bars 120 to 126 in comparison to bars 110 to 116. Hence, the data processing might significantly be delayed.

Figure 2:
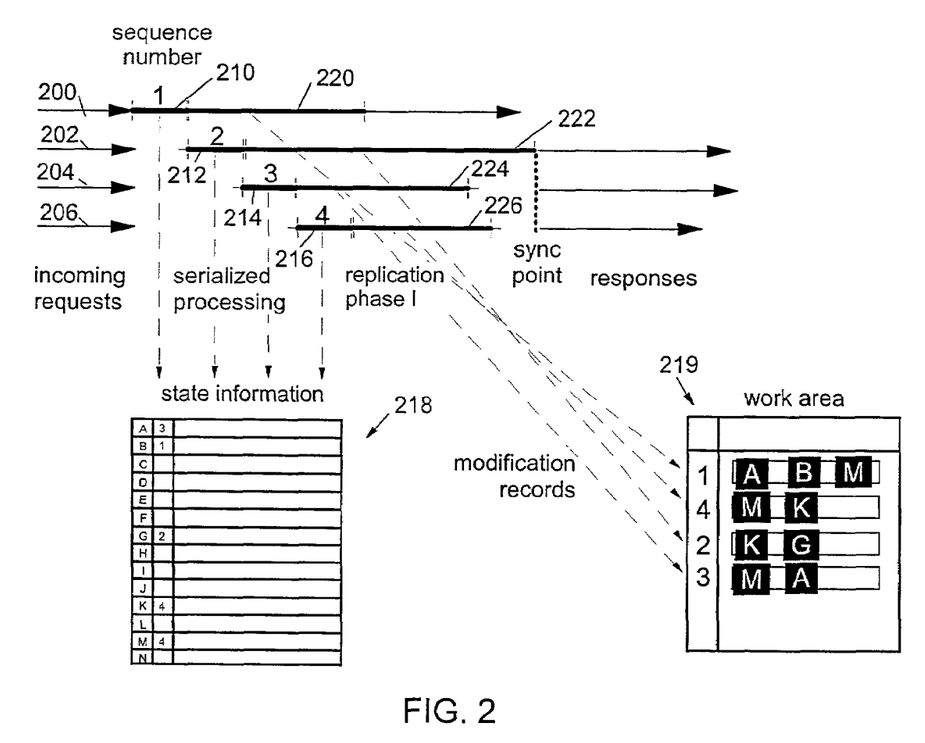
FIG. 2 shows a functional diagram of a first phase of the data processing in the replication system according to the present invention.

Now with reference to FIG. 2, there is depicted a functional diagram of a first phase of the data processing in the replication system consistent with the present invention. As in the diagram of FIG. 1, a first incoming request 200, a second incoming request 202, a third incoming request 204 and a fourth incoming request 206 are concurrently arriving at an input port of a first data processing system.

For data processing consistent with the present invention, only one incoming request can be served at the same time. Therefore, the incoming requests 200 to 206 are processed one after the other as illustrated by the staggered bars 210 to 216. Bar 210 represents the time gap that is required to serve the first incoming request 200. Bars 212, 214 and 216 represent the lapse of time needed to serve the second, third and fourth incoming request 202 to 206, respectively. Immediately after the processing of the first incoming request 200 is concluded the processing of the second incoming request 202 is started as illustrated by bar 212.

The updating of the state information stored in a table 218 is indicated by arrows running from bars 210 to 216 downwards to the table 218. The table 218 includes three columns. The first one is provided to store a unique key for each record of the state information. The second column keeps an indicator representing to which incoming request the most recently applied change is related and the third column contains the actual state information. The table storing the state information might comprise more fields depending on the information that has to be stored.

Concurrently to the processing of the second incoming request a first phase replication process is launched, i.e., changes, which were applied to the original state information as a result of the first incoming request 200, are forwarded to a second data processing unit. Such changes are transmitted to a dedicated storage subsystem of the second data processing system called "work area" 219. The data transmission of the first phase replication is indicated by arrows running from the bars 220 to 226 towards different rows of the work area 219. The work area 219 comprises at least as many storage spaces for taking a particular modification, record as the number of modification records that can concurrently be transmitted. Furthermore, the work area is adapted to be able to receive all concurrently transmitted modification records at the same time.

In work area 219, the indicator showing to which incoming request the transmitted modifications are related is stored next to the actual changes. The letters in one line represent the changes to particular records of the state information. Thus, the first incoming request causes changes to records "A", "B" and "M", the second incoming request causes changes to records, "K", and "G", the third one to records "M" and "A" and the fourth one to records "M", and "K".

In contrast with the procedure as shown in the prior art of FIG. 1, consistent with the present invention the second data processing system is only notified of the changes applied to the original copy of the state information. The change of the replica takes place at a later point in time, independently from the data processing of the first data processing unit in a second replication phase.

In order to provide the behavior of a synchronous replication system, a response message to the sender of the incoming request is sent after the changes to the original state information have successfully been transmitted to and stored in the work area. According to a preferred embodiment of the present invention, the work area is situated on and controlled by the second data processing system.

The time gap for these actions is depicted as bar 220 which follows bar 210. At the rightmost end of bar 220 the moment in time is reached when the response message is sent to the sender of the first incoming request 200 indicating that the request has been served.

However, before dispatching a response message to the sender of the respective incoming request notifying the sender that the request processing completed, it is checked whether or not the modifications of all previously requested changes have been successfully transmitted to the work area and the respective acknowledgment has been received. In other words, only if the first phase replications of all predecessors of a particular incoming request are ended and the first phase replication of the particular incoming request is concluded as well, the response message of the particular incoming request and the response messages of all predecessors are sent. Such a scenario is described with reference to the incoming requests 202 to 204 of FIG. 2.

The first phase replication of the second incoming request 202 is illustrated as bar 222. Correspondingly, the first phase replication of changes because of the third and fourth incoming requests 204 and 206 are illustrated by the bars 224 and 226.

As it can be seen in FIG. 2 the first phase replication 222 of the second incoming request 202 only completes after the first phase replications 224 and 226 of the third and fourth incoming requests 214 and 216 do. This might be because of the amount of data to be transmitted or some issues related to the transmission facility. However, in order to ensure a synchronous behavior of the overall replication system, the respective senders are not notified of the completion of the first phase replication 224 and 226 related to the third and fourth incoming requests 204 and 206 until the first phase replication 222 related to the second incoming request is concluded. This point of time is called "synchronization point" and is indicated by a dotted line running from the rightmost end of bar 222 downwards.

It is apparent from the example explained above that because processing the first phase replication in parallel, a significant improvement of the overall performance can be achieved.

Figure 3:
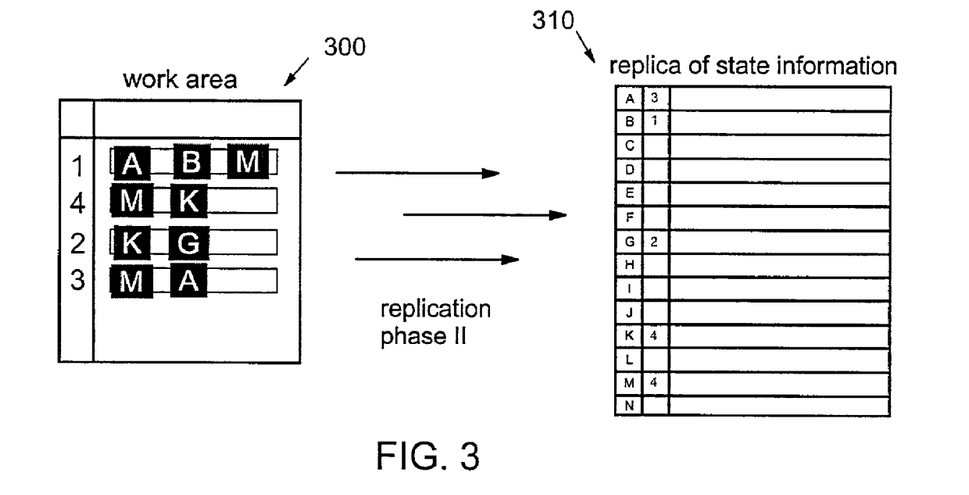
FIG. 3 shows a functional diagram of a second phase of the data processing in the replication system according to the present invention.

Now with reference to FIG. 3, there is depicted a functional diagram of a second phase of the data processing in the replication system consistent with the present invention. A work area 300 is formed by a dedicated storage subsystem of the second data processing system. After the data transmission of the first phase replication as shown in FIG. 2, all transmitted modification records are stored in work area 300.

As known from FIG. 2, work area 300 of FIG. 3 also stores the indicator showing-to which incoming request the transmitted modifications are related. The following letters represent the changes to particular records of the state information. Thus, the first incoming request causes changes to records "A", "B" and "M", the second incoming request causes changes to records "K" and "G", the third one to records "M" and "A" and the fourth one to records "M" and "K".

In a second replication phase, the changes stored in the modification records of work area 300 are applied to a replica of state information 310 as illustrated by arrows pointing from work area 300 toward replica 310. Identical to the original table keeping the state information, as described above, the replica of the state information is also formed by a table comprising three columns. The first one stores a unique key for each record of the state information. The second column keeps an indicator representing to which incoming request the most recently applied change is related and the third column contains the actual state information.

The second replication phase is independent of the request processing performed on the first data processing unit. It is purely done on the second data processing unit which serves as a backup system. The modification records are picked from work area 300 and the modifications are applied to the replica of state information 310. A method and system consistent with the present invention allows parallel and out-of-sequence processing while applying the modifications to the replica 310.

First, a modification record is picked from work area 300. Then, the indicators are checked to identify whether or not all modification records related to preceding changes to the original state information have successfully been stored in work area 300. If no, then a different modification record is chosen. This ensures that a consistent state can be achieved. If yes, then, for each element listed in the picked modification record, the current indicator stored in the second column of the replica of state information 310 is checked. If the indicator shows that the last modification of the particular record of the replica was because of a change previously applied to the original state information, then the record is replaced with the element taken from the modification record. In case the indicator refers to a more recent change to the original state information than it is remained unchanged, since is has been updated by a more recent modification record.

In case the modified record is applied to the replica, the entire record is overwritten and not only the modified portion. This ensures a correct replica also if modified records are applied to the replica in an order that is different to the order of the changes to the original state information.

Figure 4:
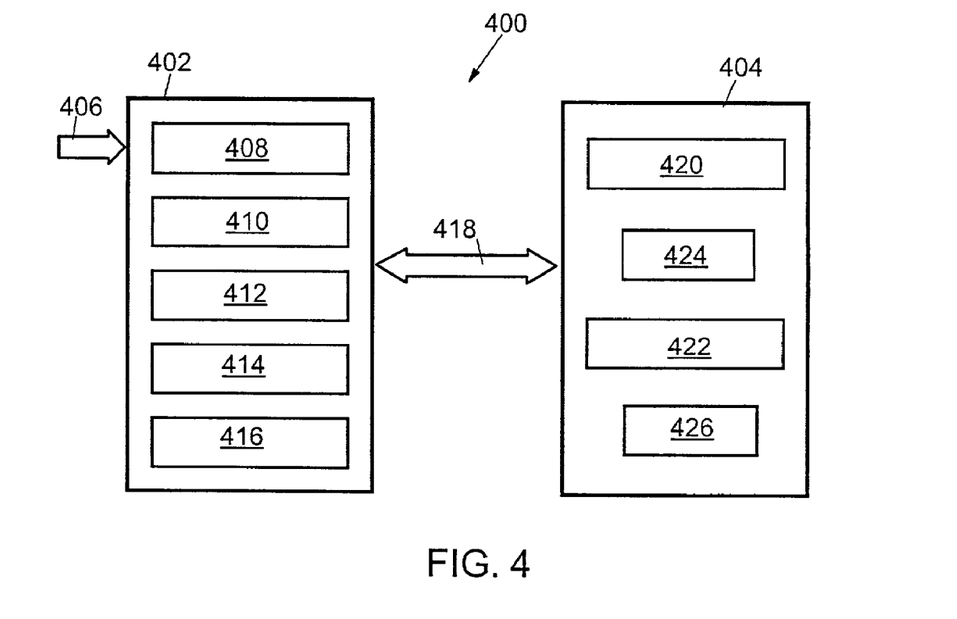
FIG. 4 shows a high-level block diagram of a replication system according to the present invention.

Finally, with reference to FIG. 4, there is depicted a high-level block diagram of a replication system 400 consistent with the present invention. System 400 replicates state information stored in a first data processing unit 402 to a second data processing unit 404, whereby the state information is kept in a set of records. The first data processing unit 402 includes many parts. It includes an input port 406 for receiving an incoming request message for changing the state information, an initializing unit 408 for assigning an indicator to the incoming request message representing the order in which the incoming request messages will be processed, and a first processing unit 410 for processing the incoming request message and updating the set of records in accordance with the result of the processing of the incoming request message. It further includes a communication unit 412 for sending a modification record to the second data processing unit containing the indicator assigned to the incoming request message and all changes applied to the set of records performed during processing of the incoming request message and a control unit 414 for checking acknowledge messages which have been received from the second data processing unit indicating a receipt of the sent modification records and a respond unit 416 for sending a response message as a reaction to an incoming request message to the respective sender for such incoming request messages the modification record of which and the modification records of all its predecessors have been received by the second data processing unit.

First data processing unit 402 and second data processing unit 404 are connected to each other with a bi-directional communication channel 418 to allow concurrent transmission of modification records to the second data processing unit 404. Second data processing unit 404 includes a first storage subsystem 420 for storing received modification records sent by the first data processing unit 402. First storage subsystem 420 is identical to the work area as described above. First storage subsystem 420 is configured to be able to receive and store all modification records at the same time which are concurrently sent by first data processing unit 402 over the communication channels 418.

Second processing system 404 further includes a second storage subsystem 422 for storing the replicated set of records and a second processing unit 424 for applying the changes indicated by the modification records stored in first storage subsystem 420 to the set of records stored in the second storage subsystem 422. Each record stored in second storage subsystem 422 includes a field for storing the indicator and second processing unit 424 is configured to store the indicator assigned to the processed request message in the respective field of all changed records when applying changes. Second processing unit 424 is further configured to check the indicator and to only apply modifications which are more recent than the last change applied to a particular record.

Second data processing system 404 further includes an acknowledge unit 426 for returning an acknowledge message to first data processing unit 402 over the communication channels 418 indicating a receipt of a particular modification record after it has been stored in the first storage subsystem. Each record includes a field for storing the indicator and first processing unit 410 is configured to store the indicator assigned to the processed request message in the respective field of all changed records stored in the first data processing unit. Initializing unit 408 is further configured to determine the next incoming request to serve, in case more than one incoming request is waiting to be processed.

Although various embodiments are shown, one skilled in the art will appreciate that all or part of the methods and system consistent with the present invention may appreciate that the methods and systems consistent with the present invention may contain additional or different components. Other embodiments of the invention will be apparent to those skilled in the art form consideration of the specification and practice of the invention disclose herein. It is intended that the specification and examples be considered as exemplary only, with a true scope and spirit of the invention being indicated by the following claims.

What is claimed is:

1. A method for parallel replication of state information of a first data processing unit in at least one second data processing unit, each of the at least one second data processing units having a replica of the state information of the first data processing unit, the method comprising:

processing a plurality of incoming request messages for changing the state information in the first data processing unit;

sending a modification record to at least one storage subsystem, the modification record containing all changes applied during processing of each of the plurality of incoming request messages;

sending a response message to a sender of each of the plurality of incoming request messages after confirming a receipt of the modification record for the incoming request message and modification records of all predecessors of the incoming request message by each of the at least one storage subsystems; and updating state information in the replica of each of the at least one second data processing units based on the modification records, wherein:

each of the plurality of incoming request messages contains an indicator and the modification record contains the indicator assigned to a corresponding incoming request message and all corresponding changes applied to a set of records used to represent the state information of the first data processing unit; and the processing of one of the plurality of incoming request messages is performed concurrently with sending of a modification record associated with another one of the plurality of incoming request messages to facilitate parallel processing of the incoming request messages.

2. The method of claim 1, wherein the indicator represents an order in which the incoming request message is to be processed.

3. The method of claim 1, wherein the at least one storage subsystem resides on the at least one second data processing unit.

4. The method of claim 1, wherein an acknowledge message is sent from the at least one storage subsystem to the first data processing unit to confirm receipt of a modification record.

5. The method of claim 1, wherein the first data processing unit is capable of concurrently sending a plurality of modification messages to each of the at least one storage subsystems.

6. A system for parallel replication of state information of a first data processing unit in at least one second data processing unit, each of the at least one second data processing units having a replica of the state information of the first data processing unit, the system comprising:

a first processing unit comprising a processor for processing a plurality of incoming request messages for changing the state information in the first data processing unit;

a change unit for sending a modification record to at least one storage subsystem, the modification record containing all changes applied during processing of each of the plurality of incoming request messages;

a respond unit for sending a response message to a sender of each of the plurality of incoming request messages after confirming a receipt of a modification record for the incoming request message and modification records of all predecessors of the incoming request message by each of the at least one storage subsystems; and at least one second processing unit comprising a processor for updating state information in the replica of each of the at least one second data processing units based on the modification records, wherein: each of the plurality of incoming request messages contains an indicator and the modification record contains the indicator assigned to a corresponding incoming request message and all corresponding changes applied to a set of records used to represent the state information of the first data processing unit; and the processing of one of the plurality of incoming request messages is performed concurrently with sending of a modification record associated with another one of the plurality of incoming request messages to facilitate parallel processing of the incoming request messages.

7. The system of claim 6, wherein the indicator represents an order in which the incoming request message is to be processed.

8. The system of claim 6, wherein the at least one storage subsystem resides on the at least one second data processing unit.

9. The system of claim 6, wherein an acknowledge message is sent from the at least one storage subsystem to the first data processing unit to confirm receipt of a modification record.

10. The system of claim 6, wherein the first data processing unit is capable of concurrently sending a plurality of modification messages to each of the at least one storage subsystems.

11. A system comprising a processor for parallel replication of state information of a first data processing unit in at least one second data processing unit, each of the at least one second data processing units having a replica of the state information of the first data processing unit, the system comprising:

means for processing a plurality of incoming request messages for changing the state information in the first data processing unit;

means for sending a modification record to at least one storage subsystem, the modification record containing all changes applied during processing of each of the plurality of incoming request messages;

means for sending a response message to a sender of the incoming request message after confirming a receipt of a modification record for each of the plurality of incoming request messages and modification records of all predecessors of the incoming request message by each of the at least one storage subsystems; and means for updating state information in the replica of each of the at least one second data processing units based on the modification records, wherein:

each of the plurality of incoming request messages contains an indicator and the modification record contains the indicator assigned to a corresponding incoming request message and all corresponding changes applied to a set of records used to represent the state information of the first data processing unit; and the means for processing one of the plurality of incoming request messages is performed concurrently with means for sending a modification record associated with another one of the plurality of incoming request messages to facilitate parallel processing of the incoming request messages.

12. A system comprising a processor for replicating state information stored in a first data processing unit to a second data processing unit, whereby the state information is kept in a set of records, the system comprising:

an input port for receiving an incoming request message for changing the state information;

an initializing unit for assigning an indicator to the incoming request message representing the order in which the incoming request messages will be processed;

a first processing unit for processing the incoming request message and updating the set of records in accordance with the result of the processing of the incoming request message;

a communication unit for sending a modification record to a first storage subsystem containing the indicator assigned to the incoming request message and all changes applied to the set of records performed during processing of the incoming request message;

a control unit for checking acknowledge messages which have been received from the first storage subsystem indicating a receipt of the sent modification records; and a respond unit for sending a response message as a reaction to an incoming request message to the respective sender for such incoming request messages, the modification record of which and the modification records of all its predecessors having been received by the second data processing unit, wherein the first processing unit and the communication unit operate concurrently.

13. The system according to claim 12, wherein the first storage subsystem is formed on the second data processing unit.

14. The system according to claim 12, wherein the first data processing unit and the second data processing unit are connected to each other with more than one communication channel to allow concurrent transmission of modification records to the first storage subsystem on the second data processing unit.

15. The system according to claim 14, further comprising an acknowledge unit for returning an acknowledge message to the first data processing unit indicating a receipt of a particular modification record after it has been stored in the first storage subsystem.

16. The system according to claim 12, wherein the first storage subsystem is configured to be able to receive and store all modification records at the same time which are concurrently sent by the first data processing unit.

17. The system according to claim 12, wherein the second data processing unit comprises a second storage subsystem for storing the replicated set of records and a second processing unit for applying the changes indicated by the modification records stored in the first storage subsystem to the set of records stored in the second storage subsystem.

18. The system according to claim 17, wherein each record stored in the second storage subsystem includes a field for storing the indicator and the second processing unit is configured to store the indicator assigned to the processed request message in the respective field of all changed records when applying changes.

19. The system according to claim 17, wherein the second processing unit is further configured to check the indicator and to only apply modifications which are more recent than the last change applied to a particular record.

20. The system according to claim 12, wherein each record includes a field for storing the indicator and the first processing unit is configured to store the indicator assigned to the processed request message in the respective field of all changed records.

21. The system according claim 12, wherein the initializing unit is further configured to determine the next incoming request to serve, in case more than one incoming request is waiting to be processed.

22. A computer program product stored on a computer usable medium, comprising computer readable program means for causing a computer to perform a method for replicating state information stored in a first data processing unit to a second data processing unit, whereby the state information are kept in a set of records, the method comprising:

receiving an incoming request message for changing the state information;

assigning an indicator to the incoming request message representing the order in which the incoming request messages are processed;

processing the incoming request message and updating the set of records in accordance with the result of the processing of the incoming request message;

sending a modification record to a first storage subsystem containing the indicator assigned to the incoming request message and all changes applied to the set of records performed during processing of the incoming request message;

checking acknowledge messages which have been received from the second data processing unit indicating a receipt of the sent modification records; and sending a response message as a reaction to an incoming request message to the respective sender for such incoming request messages the modification record of which and the modification records of all its predecessors have been received by the first storage subsystem, wherein the processing of the incoming request and sending of the modification record are performed concurrently.

23. The computer program product according to claim 22, wherein the steps of receiving an incoming request message, assigning an indicator, processing the incoming request message and sending a modification record are performed concurrently to the steps of checking acknowledge messages and sending a response message.

24. The computer program product according to claim 22, wherein sending modification record to the first storage subsystem is performed concurrently with sending other modification records to the first storage subsystem.

25. The computer program product according to claim 22, wherein the first storage subsystem is provided on the second data processing unit, the first and the second data processing unit are connected to each other with more than one communication channel and the method further comprises storing all modification records into the first storage subsystem on the second data processing unit.

26. The computer program product according to claim 25, wherein the first storage subsystem is configured to be able to receive all modification records at the same time which are concurrently sent by the first data processing unit and the method further comprises concurrently storing all modification records into the first storage subsystem.

27. The computer program product according to claim 25, further comprising returning an acknowledge message to the first data processing unit indicating a receipt of a particular modification record after it has been stored in the first storage subsystem.

28. The computer program product according to claim 22, wherein the second data processing unit comprises a second storage subsystem for storing the replicated set of records and the method further comprises applying the changes indicated by the modification record stored in the first storage subsystem to the set of records stored in the second storage subsystem.

29. The computer program product according to claim 28, wherein each record stored in the second storage subsystem includes a field for storing the indicator and applying the changes includes storing the indicator assigned to the processed request message in the respective field of all changed records.

30. The computer program product according to claim 28, wherein applying changes includes checking the indicator and only modifications more recent than the last change applied to a particular record are applied.

31. The computer program product according to claim 22, wherein each record includes a field for storing the indicator and updating the set of records includes storing the indicator assigned to the processed request message in the respective field of all changed records.

32. The computer program product according to claim 22, wherein receiving an incoming request for changing the state information is followed by determining the next incoming request to serve, in case more than one incoming request is waiting to be processed.

* * * * *